Patented Nov. 5, 1935

2,020,257

UNITED STATES PATENT OFFICE 2,020,257

FOOD PRODUCT AND METHOD OF PREPARING THE SAME

Arnold C. Dickinson, Lunenburg, Mass., assignor to Sardik Incorporated, Jersey City, N. J., a corporation of Delaware No Drawing. Application July 8, 1933, Serial No. 679,577

2 Claims. (Cl. 99—10)

This invention relates to an improved food product and to a method of preparing the same.

It has been customary for many years for consumers to mix or combine various fruits and the like with different breakfast cereals for consumption such, for example, as bananas and corn flakes, strawberries and shreaded wheat, and numerous other combinations depending upon different individual tastes. While any one of the various breakfast cereals is available at any time, the fruits or the like must usually be fresh and, hence, their selection is limited by the season.

An object of this invention is to provide a breakfast food combining with cereal a fruit product in a deterioration-resistant state and providing in a single article, which can be packed and used in the usual way, the taste, food value and the like of the different original materials.

There has recently been made available by the invention set forth in the Sartakoff Patent Number 1,908,489, a deterioration-resistant fruit product which because of its low moisture content is particularly well adapted to the purposes of the present invention, although other products can, of course, be used. Referring, for example, to the banana product of the Sartakoff invention, it comprises the original fruit except for the moisture content which has been reduced to a point below that at which fermentation or deterioration will occur, leaving the constituents of the original fruit substantially unaffected, including the vitamin content, flavor, color, food value and the original sugar.

In accordance with the present invention such material is broken up into small particles to form more or less of a powder or granular mass. If the corn flakes, or whatever other suitable breakfast cereal is desired, are heated and the fruit powder such as the above described banana dusted on the heated cereal, the heat thereof causes sufficient softening or melting of the sugar and other natural cementitious constituents embodied in the fruit powder to make them sticky with the result that the banana powder adheres to and becomes a part of the cereal. Usually, the powder will be dusted on the cereal in sufficient quantity to form a thin coating or layer over each flake or other piece of cereal and it may or may not entirely enclose such separate particles of cereal.

The operation can be performed at any desired time but it is preferably carried out during the manufacture of the cereal itself. For example, corn flakes can be dusted with banana powder of the type set forth when they are taken out of the oven in their original manufacture, or they can be subsequently heated for the purpose. It will be apparent that other cereals than corn flakes such as puffed wheat, puffed rice, shreaded wheat, different forms of bran flakes and other cereals can be treated in accordance with the present invention to produce a breakfast food comprising any combination of cereal and fruit, with the fruit in a deterioration-resistant form, comprising an integral part of the finished article and contributing to the cereal the flavor and food value of the original fruit.

If desired, the powder rather than the cereal may be heated or otherwise treated to cause it to adhere to the cereal.

It will also be apparent that numerous other non-starchy, non-farinaceous food materials than banana can be prepared by the Sartakoff process and substituted for the banana in carrying out the present invention. Such materials as apples, peaches, oranges, tomatoes and the like are equally well adapted to the present invention and the term fruit as employed herein is intended to include generally such materials.

I claim:

1. A unitary deterioration-resistant food product of low moisture content comprising two dissimilar food materials, one being a cereal in flaked or shredded form or the like, prepared and cooked under relatively high heat and the other a fruit in finely divided condition separately prepared and reduced in moisture content under relatively low heat, the two being united, without intermingling one with the other, by the natural cementitious constituents of the fruit which have been rendered effective for this purpose by heating to a point sufficient to render them sticky.

2. The improvement in the art of preparing a composite unitary food product of low moisture content by uniting a finely divide deterioration-resistant fruit product and a flaked or shredded deterioration-resistant cereal product while preserving the essential nutritive characteristics of each and without intermingling one with the other, which consists in bringing into contact with each other the fruit product, from which moisture has been removed by the application of heat thereto at relatively low temperature, and the cereal product, which has been prepared and cooked by the application of heat at such relatively high temperature as would destroy the nutritive value of the fruit product were it submitted thereto, heating the fruit product while in contact with the cereal product to an extent sufficient to cause the natural cementitious constituents of the fruit product to become sufficiently adhesive to attach the fruit product to the cereal product, and then cooling the united products.

ARNOLD C. DICKINSON.